US008216357B2

(12) United States Patent
Pickett

(10) Patent No.: US 8,216,357 B2
(45) Date of Patent: Jul. 10, 2012

(54) PROTECTIVE COATING COMPOSITIONS AND DEVICES

(75) Inventor: James Edward Pickett, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 354 days.

(21) Appl. No.: 12/566,962

(22) Filed: Sep. 25, 2009

(65) Prior Publication Data

US 2011/0073171 A1   Mar. 31, 2011

(51) Int. Cl.
*C09B 67/00* (2006.01)
*H01L 27/14* (2006.01)
*H01L 31/00* (2006.01)
*C08K 5/34* (2006.01)

(52) U.S. Cl. ............ 106/287.21; 524/100; 136/252; 257/E25.032; 977/932

(58) Field of Classification Search .......... 524/100; 427/384; 106/287.21; 257/E25.032; 977/932; 136/252
See application file for complete search history.

(56) References Cited

U.S. PATENT DOCUMENTS

| | | | |
|---|---|---|---|
| 5,763,674 A | 6/1998 | Pickett et al. | |
| 5,786,411 A | 7/1998 | Barren et al. | |
| 5,856,486 A | 1/1999 | Pickett et al. | |
| 5,869,185 A | 2/1999 | Bahr et al. | |
| 5,905,172 A | 5/1999 | Pickett et al. | |
| 5,981,073 A | 11/1999 | Pickett et al. | |
| 5,990,188 A * | 11/1999 | Patel et al. | 522/28 |
| 6,395,922 B1 | 5/2002 | Pickett | |
| 7,138,176 B2 | 11/2006 | Murschall et al. | |
| 7,288,583 B2 | 10/2007 | Andrews et al. | |
| 7,312,290 B2 | 12/2007 | Chisholm et al. | |
| 7,399,571 B2 | 7/2008 | Bogerd et al. | |
| 2006/0204746 A1 * | 9/2006 | Li et al. | 428/332 |
| 2009/0130489 A1 | 5/2009 | Stollwerck et al. | |

FOREIGN PATENT DOCUMENTS

| | | |
|---|---|---|
| DE | 102007050192 A1 | 4/2009 |
| WO | 2006121484 A2 | 11/2006 |
| WO | 2009049904 A1 | 4/2009 |

OTHER PUBLICATIONS

EP10170065 Search Report, Sep. 22, 2010.
DE102007050192 Abstract, Apr. 23, 2009.
James E. Pickett; Permanence of UV Absorbers in Plastics and Coatings; Handbook of Polymer Degradation, Second edition, Revised and Expanded; pp. 163-190.
James E. Pickett; UV Absorber Permanence and Coating Lifetimes; Journal of Testing and Evaluation, May 2004, vol. 32, No. 3; pp. 240-245.

* cited by examiner

*Primary Examiner* — Michael M Bernshteyn
(74) *Attorney, Agent, or Firm* — Francis T. Coppa

(57) ABSTRACT

In one aspect of the present invention, a UV-protective coating composition is described. The UV protective coating composition includes an acrylate polymer; and a non-crystallizing UV-absorber composition. The non-crystallizing UV absorber composition includes a dibenzoylresorcinol and at least one triazine compound. The dibenzoylresorcinol is present at a level in the range of from about 10 weight percent to about 25 weight percent, based on the total weight of the coating composition. Also provided is an article that includes the UV protective coating composition, and a method to protect the article.

5 Claims, No Drawings

PROTECTIVE COATING COMPOSITIONS AND DEVICES

STATEMENT REGARDING FEDERALLY SPONSORED RESEARCH & DEVELOPMENT

This invention was made with Government support under contract number DE-FC36-07G017045, awarded by DOE. The Government has certain rights in the invention.

BACKGROUND

This invention generally relates to a coating composition for UV protection. More particularly, the invention relates to a UV protective coating composition for protection in optoelectronic devices. The invention also relates to optoelectronic devices using such coatings.

Materials like thermoplastic resins often possess an attractive set of mechanical and physical properties, such as high heat resistance, impact resistance, dimensional stability, high ductility, and optical clarity. However, these materials are usually susceptible to photodegradation by ultraviolet (UV) light. This type of degradation typically leads to erosion and yellowing of the polymer surface, e.g., in the case of polymer substrates. Efforts to alleviate these problems have been undertaken in the past. Optically transparent coatings are employed to protect polymeric substrates and other substrates from the effects of the weather. Highly weatherable coatings are required for many applications such as architectural glazing, automotive glazing, and solar energy (e.g., protective coatings for photovoltaic modules). These applications require maintenance of properties for a long duration of time, for example, at least 15 years for automotive use and sometimes, more than 25 years for solar and architectural applications. Most of these coatings employ organic UV absorbers to give good weathering properties. As an example, coating compositions that include ultraviolet light absorbers have been applied onto thermoplastic substrates and then cured.

The UV absorbing agents themselves sometimes decompose to some degree, upon exposure to UV light. UV absorbers degrade at various rates, and the rate can be dependent on the polymer matrix in which it resides. The decomposition results in decreasing the UV blocking capability, and thereby, exposing the underlying substrate to the degrading effects of UV light, abrasion, and the like. Thus, the purpose of the coating in protecting the substrate is defeated to some extent. A way to mitigate UV absorber loss is to increase the UV absorber loading and/or increase the thickness of the coating. However, there are practical limitations to this approach since high additive loadings and/or thick coatings can adversely affect the physical properties of the coating and/or substrate as well as increase costs. Therefore, to make very highly weatherable coatings, one needs very stable UV absorbers.

Certain triazine UV absorbers have high molar absorbtivity and excellent photostability but are poorly compatible with desirable coating matrices. Photostability is defined as loss of absorption per $MJm^{-2} nm^{-1}$ (measured at 340 nm) of xenon arc exposure. However, certain dibenzoylresorcinols have excellent photostability and good compatibility with coating matrices, but have relatively low absorbtivity.

Therefore, there is a need for new coating compositions, which are effective in providing UV protection for a variety of different types of substrates. The compositions should exhibit a high degree of UV stability, i.e., photostability, while still being effective in protecting the substrate. Additionally, the compositions should have high absorbtivity while minimizing coating thickness and UV absorber loading. In addition, the compositions should be amenable to various forms of use, e.g., they should be capable of being easily applied to a surface being protected, without crystallizing out. The coating compositions should also not interfere with any of the other properties possessed by the substrate, such as transparency. Furthermore, the compositions should be relatively easy to manufacture, and their use should not involve an excessive increase in the cost.

BRIEF DESCRIPTION

One aspect the present invention provides a UV-protective coating composition, which includes an acrylate polymer; and a non-crystallizing UV-absorber composition. The non-crystallizing UV absorber composition includes a dibenzoylresorcinol and at least one triazine compound. The dibenzoylresorcinol is present at a level in the range of about 10 weight percent to about 25 weight percent, based on the total weight of the coating composition.

Another aspect of the present invention provides a UV-protective coating composition that includes an acrylate polymer; and a non-crystallizing UV-absorber composition. The non-crystallizing UV absorber composition includes a dibenzoylresorcinol and a triazine compound, wherein the dibenzoylresorcinol is present at a level sufficient to prevent the substantial crystallization of the triazine compound, under temperature and humidity conditions of evaporation for solvents or solvent mixtures in the coating composition, after deposition of the coating on a selected substrate.

Another aspect of the present invention provides an optoelectronic device. The optoelectronic device includes at least one substrate or surface; and a UV-protective coating composition, disposed on at least one electromagnetic radiation-receiving or radiation-emitting surface of the device. The UV-protective coating composition includes an acrylate polymer; and a non-crystallizing UV-absorber composition. The non-crystallizing UV absorber composition includes a dibenzoylresorcinol and at least one triazine compound. The dibenzoylresorcinol is present at a level as described above, e.g., in the range of from about 10 weight percent to about 25 weight percent, based on the total weight of the coating composition.

Another aspect of the invention provides a method of protecting an article from the effects of radiation. The method includes the step of coating the article with a UV-protective composition. The UV-protective coating composition includes an acrylate polymer; and a non-crystallizing UV-absorber composition. The non-crystallizing UV absorber composition includes a dibenzoylresorcinol and at least one triazine compound. The dibenzoylresorcinol is present at a level in the range of from about 10 weight percent to about 25 weight percent, based on the total weight of the coating composition.

DETAILED DESCRIPTION

While only certain features of the invention have been illustrated and described herein, many modifications and changes will occur to those skilled in the art. It is, therefore, to be understood that the appended claims are intended to cover all such modifications and changes as fall within the true spirit of the invention. In the specification and claims, reference will be made to a number of terms, which have the following meanings.

The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

"Optional" or "optionally" means that the subsequently described event or circumstance may or may not occur, and that the description includes instances where the event occurs and instances where it does not.

As used herein, the term "aliphatic radical" refers to an organic radical having a valence of at least one, consisting of a linear or branched array of atoms, which is not cyclic. Aliphatic radicals are defined to comprise at least one carbon atom. The array of atoms comprising the aliphatic radical may include heteroatoms such as nitrogen, sulfur, silicon, selenium and oxygen, or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., $—CH_2CHBrCH_2—$), and the like. Further examples of aliphatic radicals include allyl, aminocarbonyl (i.e., $—CONH_2$), carbonyl, 2,2-dicyanoisopropylidene (i.e., $—CH_2C(CN)_2CH_2—$), methyl (i.e., $—CH_3$), methylene (i.e., $—CH_2—$), ethyl, ethylene, formyl (i.e., $—CHO$), hexyl, hexamethylene, hydroxymethyl (i.e., $—CH_2OH$), mercaptomethyl (i.e., $—CH_2SH$), methylthio (i.e., $—SCH_3$), methylthiomethyl (i.e., $—CH_2SCH_3$), methoxy, methoxycarbonyl (i.e., $CH_3OCO—$), nitromethyl (i.e., $—CH_2NO_2$), thiocarbonyl, trimethylsilyl (i.e., $(CH_3)_3Si—$), t-butyldimethylsilyl, 3-trimethyoxysilylpropyl (i.e., $(CH_3O)_3SiCH_2CH_2CH_2—$), vinyl, vinylidene, and the like. By way of further example, a $C_1$-$C_{10}$ aliphatic radical contains at least one but no more than 10 carbon atoms. A methyl group (i.e., $CH_3—$) is an example of a $C_1$ aliphatic radical. A decyl group (i.e., $CH_3(CH_2)_9—$) is an example of a $C_{10}$ aliphatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2—$) is a cycloaliphatic radical, which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms, which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., $—C_6H_{10}C(CF_3)_2C_6H_{10}—$), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}O—$), and the like. Further examples of cycloaliphatic radicals include 4-allyloxycyclohex-1-yl, 4-aminocyclohex-1-yl (i.e., $H_2NC_6H_{10}—$), 4-aminocarbonylcyclopent-1-yl (i.e., $NH_2COC_5H_8—$), 4-acetyloxycyclohex-1-yl, 2,2-dicyano isopropylidenebis(cyclohex-4-yloxy) (i.e., $—OC_6H_{10}C(CN)_2C_6H_{10}O—$), 3-methylcyclohex-1-yl, methylenebis(cyclohex-4-yloxy) (i.e., $—OC_6H_{10}CH_2C_6H_{10}O—$), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., $—OC_6H_{10}(CH_2)_6C_6H_{10}O—$), 4-hydroxymethylcyclohex-1-yl (i.e., $4-HOCH_2C_6H_{10}—$), 4-mercaptomethylcyclohex-1-yl (i.e., $4-HSCH_2C_6H_{10}—$), 4-methylthiocyclohex-1-yl (i.e., $4-CH_3SC_6H_{10}—$), 4-methoxycyclohex-1-yl, 2-methoxycarbonylcyclohex-1-yloxy ($2-CH_3OCOC_6H_{10}O—$), 4-nitromethylcyclohex-1-yl (i.e., $NO_2CH_2C_6H_{10}—$), 3-trimethylsilylcyclohex-1-yl, 2-t-butyldimethylsilylcyclopent-1-yl, 4-trimethoxysilylethylcyclohex-1-yl (e.g., $(CH_3O)_3SiCH_2CH_2C_6H_{10}—$), 4-vinylcyclohexen-1-yl, vinylidenebis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O—$) represents a $C_4$ cycloaliphatic radical. The cyclohexylmethyl radical ($C_6H_{11}CH_2—$) represents a $C_7$ cycloaliphatic radical.

As used herein, the term "aromatic radical" refers to an array of atoms having a valence of at least one, comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoro methylphenyl, hexafluoroisopropylidenebis(4-phen-1-yloxy) (i.e., OPhC($CF_3$)$_2$PhO—), 4-chloromethylphen-1-yl, 3-trifluorovinyl-2-thienyl, 3-trichloromethylphen-1-yl (i.e., 3-$CCl_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis (4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis (phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical. In some embodiments the most useful aromatic group for the triazine compound is a phenyl group. In some embodiments, the most useful aromatic group for the dibenzoylresorcinol compound may be a phenyl group, or a substituted phenyl group, e.g., with 4-t-butyl, 2-methyl, 3-methyl, or 4-methyl; or with the various dimethyl and trimethyl isomers, e.g., 2,4-dimethyl. Moreover, in other embodiments, the R group in dibenzoylresorcinol is preferably hydrogen or methyl.

As noted, in one embodiment, the present invention provides a UV-protective coating composition, which includes an acrylate polymer; and a non-crystallizing UV-absorber composition. The non-crystallizing UV absorber composition includes a dibenzoylresorcinol and at least one triazine compound. The dibenzoylresorcinol is present at a level in the range of from about 10 weight percent to about 25 weight percent, based on the total weight of the coating composition.

The acrylate polymers may be prepared from acrylic monomers such as methyl acrylate, acrylic acid, methacrylic acid, methyl methacrylate, butyl methacrylate, cyclohexyl methacrylate, and the like. The term "acrylic monomer" as used herein includes esters and amides of acrylic acid, methacrylic acid and homologs and analogs thereof such as ethylacrylic, phenylacrylic or chloroacrylic acid. In one embodiment, the acrylic monomer may include one or more aliphatic, cycloaliphatic, or aromatic radicals. In another embodiment, the acrylic monomer may include a wide variety of functional groups in addition to the acrylate functionality, and may comprise one or more heteroatoms, for example, nitrogen, oxygen, sulfur and selenium.

Non-limiting examples of acrylate monomers include those selected from the group consisting of methyl (meth)acrylate; ethyl (meth)acrylate; butyl (meth)acrylate; 2-ethylhexyl (meth)acrylate; octyl (meth)acrylate; isodecyl (meth)acrylate; dodecyl (meth)acrylate; octadecyl (meth)acrylate; cyclohexyl (meth)acrylate; 4-methylcyclohexyl (meth)acrylate; isobornyl (meth)acrylate; adamantyl (meth)acrylate; phenyl (meth)acrylate; benzyl (meth)acrylate; 1-naphthyl (meth)acrylate; 4-fluorophenyl (meth)acrylate; 4-chlorophenyl (meth)acrylate; 4-bromophenyl (meth)acrylate; 2,4,6-tribromophenyl (meth)acrylate; 4-methoxyphenyl (meth)acrylate; 4-cyanophenyl (meth)acrylate; 4-phenylphenyl (meth) acrylate; 2-bromobenzyl (meth)acrylate; 2-fluoroethyl (meth)acrylate; 2-chloroethyl (meth)acrylate; 2-bromoethyl (meth)acrylate; trichloromethyl (meth)acrylate; 2-hydroxyethyl (meth)acrylate; 2-hydroxypropyl (meth)acrylate; 2-(2-ethoxyethoxy)ethyl acrylate; propylene glycol 4-nonylphenylether acrylate; glycidyl (meth)acrylate; N-butylaminoethyl (meth)acrylate; alpha-fluoro (meth)acrylate; alpha-cyano (meth)acrylate; 2,2,2-trifluoroethyl methacrylate; pentafluoropropyl methacrylate; 1,3-bis(thiophenyl)propan-2-yl acrylate; 1,3-bis(phenoxy)propan-2-yl (meth)acrylate; 1,3-bis(2,4,6-tribromophenoxy)propan-2-yl (meth)acrylate; 1,3-bis(2-mercaptobenzothiazoyl)propan-2-yl (meth)acrylate; 2-(4-chlorophenoxy)-1-[(phenylthio)methyl]ethyl (meth)acrylate; 4-bromobenzyl (meth)acrylate; tribromobenzyl (meth)acrylate; pentabromobenzyl (meth) acrylate; and 2-phenylthioethyl acrylate; and mixtures comprising thereof. In one embodiment, the acrylate monomer is at least one selected from methyl acrylate, acrylic acid, methacrylic acid, methyl methacrylate, butyl methacrylate, or cyclohexyl methacrylate. In one embodiment, the acrylate polymer is poly(methyl methacrylate) (PMMA). As those skilled in the art understand, commercially-available PMMA may include minor amounts of one or more other acrylic monomers.

In one embodiment, the acrylate polymer may have a molecular weight of about 500 to 1,000,000, and in some instances, about 20,000 to about 500,000. As used herein, "molecular weight" refers to number average molecular weight, which may be determined by the GPC method using a polystyrene standard. In one embodiment, the acrylate polymer is present in the range from about 70 weight percent to about 90 weight percent based on the total solids weight of the UV protective coating composition. In another embodiment, the acrylate polymer is present in the range from about 75 weight percent to about 80 weight percent based on the total solids weight of the UV protective coating composition.

The UV protective coating composition includes a non-crystallizing UV-absorber composition. As used herein the term "non-crystallizing" refers to substantially no crystal formation, or substantially no solidification to assume the form and structure of a crystal, or phase separation of the components. As used herein the term "non-crystallizing" can sometimes refer to a composition that is substantially haze-free, that is, has a haze value of less than about 1%. As mentioned above, the non-crystallizing UV-absorber composition includes a dibenzoylresorcinol compound. In one embodiment, the dibenzoylresorcinol compound has a structure (I)

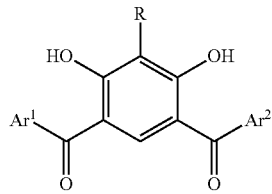

(I)

wherein $Ar^1$ and $Ar^2$ are independently at each occurrence a phenyl group or a substituted phenyl group, and R is hydrogen, $C_1$-$C_{20}$ aliphatic group, or a $C_3$-$C_{30}$ cycloaliphatic alkyl group. In one embodiment, the $Ar^1$ and $Ar^2$ are independently at each occurrence a substituted phenyl group, wherein the substituent is at least one selected from a $C_1$-$C_{20}$ aliphatic group, or a $C_3$-$C_{30}$ cycloaliphatic alkyl group. In one embodiment, the dibenzoylresorcinol compound is at least one selected from 4,6-dibenzoylresorcinol, 4,6-di(4'-tert-butylbenzoyl)resorcinol, 4,6-dibenzoyl-2-propylresorcinol, 2,4,6-tribenzoylresorcinol, or 4,6-dibenzoyl-2-(3-triethoxysilylpropyl)resorcinol. In one embodiment, the dibenzoylresorcinol compound may contain 2,4,6-tribenzoylresorcinol in minor amounts. In another embodiment, the dibenzoylresorcinol compound has a structure (II)

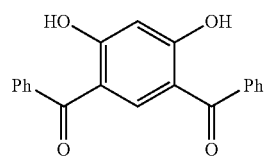

(II)

In one embodiment, the UV protective coating composition includes the dibenzoylresorcinol compound in an amount in the range from about 10 weight percent to about 30 weight percent, based on the total solids weight of the composition. In another embodiment, the dibenzoylresorcinol compound is present in an amount in the range from about 10 weight percent to about 20 weight percent, based on the total solids weight of the composition.

The non-crystallizing UV-absorber composition includes at least one triazine compound. In one embodiment, the triazine compound includes structural units derived from (III)

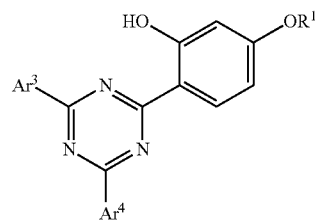

(III)

wherein $R^1$ is a hydrogen, a $C_1$-$C_{20}$ aliphatic radical, a $C_3$-$C_{30}$ cycloaliphatic radical, or a $C_3$-$C_{20}$ aromatic radical, and $Ar^3$ and $Ar^4$ are phenyl groups. In one embodiment, the triazine compound has a structure (IV)

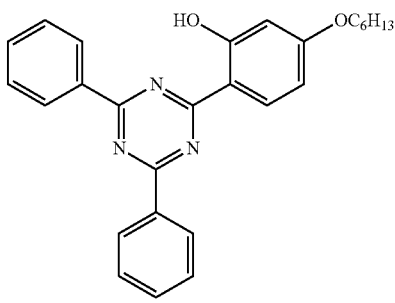

(IV)

In another embodiment, the triazine compound has a structure (V)

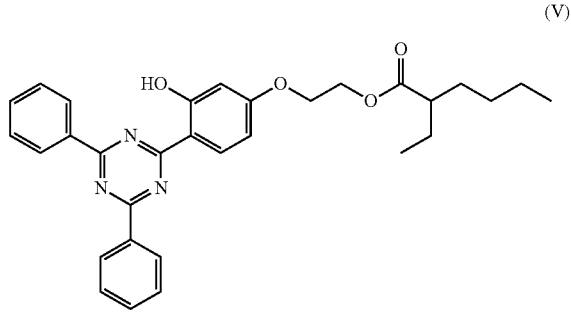

(V)

In one embodiment, the triazine compound is present in an amount in the range from about 2 weight percent to about 20 weight percent based on the total solids weight of the composition. In another embodiment, the triazine compound is present in an amount in the range from about 5 weight percent to about 15 weight percent based on the total solids weight of the composition. In one embodiment, the dibenzoylresorcinol compound may be present at a level sufficient to prevent the substantial crystallization of the triazine compound, under temperature and humidity conditions of evaporation for solvents or solvent mixtures in the coating composition, after deposition of the coating on a selected substrate.

In one embodiment, the composition may further include a solvent and/or a co-solvent. Non-limiting examples of solvents include alkanes, alcohols, ethers, esters or ketones. As used herein, the term "solvent" can refer to a single solvent or a mixture of solvents. In one embodiment, the solvent is at least one selected from ethyl acetate, butanone diacetone alcohol, ethyl acetate, or methoxypropanol. In one embodiment, the co-solvent may be a high boiling organic solvent, e.g., one having a boiling point of at least about 110° C. Examples of compounds that may be employed as solvents include, but are not limited to, toluene, xylene, 4-hydroxy-4-methyl-2-pentanone, 1-methoxy-2-propanol, 2-butyloxyethanol and the like. In another embodiment, the solvent may be a mixture of solvents having different boiling points.

In one embodiment, the UV protective coating composition may further comprise at least one additive. Non-limiting examples include anti-oxidants, hindered amine light stabilizers, flame retardants, quenchers, fillers, flow modifiers, impact modifiers, surfactants, dispersants, anti-settling agents, abrasion resistance agents, leveling agents, catalysts, photoinitiators, colorants, mold release agents, heat stabilizers, lubricants, and anti-drip agents. In one embodiment, the additive may be present in a range from about 0.1 weight percent to about 10 weight percent based on the total solid weight of the composition. In some situations, the additive may be present in a range from about 0.5 weight percent to about 5 weight percent based on the total solid weight of the composition.

Typically, the UV protective coating composition is applied to a substrate. There is generally no limitation on the type of substrate that may be employed. The UV protective coating composition may be applied to substrates such as metal, glass, semiconductor, dielectrics, ceramics, polymers, textiles, quartz and the like. In one embodiment, the substrate may be a polymer substrate. Non-limiting examples of polymer substrates include polyvinyl chloride, polyolefins, polyesters, polyamides, polysulfones, polyimides, polyether sulfones, polyphenylene sulfides, polyether ketones, polyether ether ketones, ABS resins, polystyrenes, polybutadienes, polyacrylates, polyalkylacrylates, polyacrylonitrile, polyacetals, polycarbonates, polyphenylene ethers (e.g., blended with polystyrene or rubber-modified polystyrene), ethylene-vinyl acetate copolymers, polyvinyl acetate, liquid crystal polymers, ethylene-tetrafluoroethylene copolymers, aromatic polyesters, polyvinyl fluoride, polyvinylidene fluoride, polyvinylidene chloride, tetrafluoroethylene, polyimide, polyetherimide, copolymer and blends thereof. In some specific embodiments, the polymer substrate may include poly (methyl methacrylate); poly(ethylene terephthalate), poly (butylene terephthalate); polyamides, polyimides, acrylonitrile-styrene copolymers; styrene-acrylonitrile-butadiene copolymers; polyvinyl chloride, polycarbonate, polystyrene, blends of polystyrene and polyphenylene ether; butyrates, and/or polyethylene.

In one embodiment, the UV protective coating composition may be applied over at least a portion of an article, e.g., an optoelectronic device. In one embodiment, the UV protective coating composition may be disposed on at least one electromagnetic radiation-receiving or emitting surface of the device. As used herein, the term "optoelectronic device", refers to devices that either produce light, or use light in their operation. Optoelectronic devices are electrical-to-optical or optical-to-electrical devices, or instruments that use such devices in their operation. Typically, a semiconducting junction is an integral part of optoelectronic devices. The semiconducting junction may be a p-n junction, an n-p junction, a p-i-n junction, or an n-i-p junction. For example, as those skilled in the art understand, the p-n junction is capable of generating electrical energy in the presence of sunlight, which is the basis for the general operation of photovoltaic devices or solar cells. The device further includes a conductive pathway to direct the generated electrical energy to an external circuit.

The optoelectronic devices may be of several types. In one embodiment, the optoelectronic device may be a photodiode, a light emitting diode, a photovoltaic device, or a semiconductor laser. These optoelectronic devices can be used in variety of applications. Examples of applications include an electronic display, a photo detector, general lighting, a camera, and devices which provide fiber-optic communication.

In another embodiment, the optoelectronic device may be a photovoltaic cell or a photovoltaic module. The photovoltaic module may have an array of the photovoltaic cells. The photovoltaic module may have a polymeric cover protecting the cells onto which the UV protective coating may be disposed. The UV protective coating may be disposed on the photovoltaic cells, or on the photovoltaic module, in a location that is usually exposed to solar radiation. In some embodiments, the UV protective coating may be disposed on the backside of the module polymeric cover. However, it should be understood that the UV protective coating may be disposed on more than one location of the photovoltaic module. For example, the coating can be disposed on a topside of the module polymeric cover, a backside of the module polymeric cover, and/or on a surface of the solar cells in the module, such that the coating may be exposed to the solar radiation.

In one embodiment, the photovoltaic module or the photovoltaic cell may include, but is not limited to, an amorphous silicon cell, a crystalline silicon cell, a hybrid/heterojunction amorphous and crystalline silicon cell, a CdTe thin film cell, a micromorph tandem silicon thin film cell, a $Cu(In,Ga)Se_2$ (CIGS) thin film cell, a GaAs cell, a multiple-junction III-V-based solar cell, a dye-sensitized solar cell, or a solid-state organic/polymer solar cell. In one embodiment, the solar cell may contain a transparent conductor onto which the UV protective coating may be disposed.

In some instances, the optoelectronic devices include a substrate and a multi layer structure disposed on the substrate, with the coating composition disposed on an electromagnetic radiation-receiving side of the device. The multi layer structure of the device may be selected from the group consisting of a p-n junction, a hetero-junction, a quantum well, and a superlattice. In one embodiment, the UV protective coating composition may be disposed on either side of the substrate. In another embodiment, the UV protective coating composition may be disposed on a light-receiving surface of the multi layer structure.

Methods for applying the UV protective coating composition to the substrate are also known in the art. Conventional techniques may include the application of a relatively thin layer of the matrix material to the substrate by various techniques, such as spraying, brushing, dipping, flow-coating, roll-coating, and the like. Other possible techniques include wet etching, dry etching, physical vapor deposition, sputtering, solution growth, and solution deposition. Some specific examples of suitable techniques include lithography, dip-coating, spray-coating, spin-coating, in-situ deposition, chemical vapor deposition, wet chemical solution deposition, and combinations thereof.

In one embodiment, after the coating has been applied to the substrate, substantially all of the volatile components (e.g., water or organic solvents) are evaporated—usually, by air-drying or heating. Additional heating steps may be used to remove any residual solvents. Following solvent removal, the coating usually, but not always, has a thickness in a range from about 1 micron to about 50 microns, or from about 2 microns to about 15 microns. Solid substrate articles coated with the compositions of this invention, as well as the curing products thereof, represent other aspects of the invention.

The UV protective coating composition usually exhibits good photostability. In one embodiment, the UV protective coating composition has a rate of loss of less than about 0.05 absorption units per $MJ/m^2/nm$ at about 340 nm of xenon arc exposure. In another embodiment, the UV protective coating composition has a rate of loss in a range from about 0.03 absorptions units per $MJ/m^2/nm$ to about 0.01 absorption units per $MJ/m^2/nm$, at about 340 nm of xenon arc exposure.

As mentioned above, devices or materials with the UV protective coating can be very useful in a variety of demanding optoelectronic device applications.

EXAMPLES

The following examples illustrate methods and embodiments in accordance with the invention, and as such, should not be construed as imposing limitations upon the claims.

Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like. Tinuvin® 1577 was obtained from Ciba Specialty Chemicals. ADK STAB LA-46 was obtained from Adeka Corporation. 4,6-dibenzoylresorcinol and 4,6-di(4'-t-butylbenzoyl)resorcinol were prepared as described in U.S. Pat. No. 5,869,185.

Preparation of Coated Films

Poly(methyl methacrylate) (PMMA, Elvacite® 2041 from Lucite International), was dissolved in 1-methoxy-2-propanol, and the resulting composition was heated, to prepare a 7% by weight solution. UV absorber amounts as shown in Table 1 were added to vials and dissolved in 2.65 g of solvent by heating to a temperature from about 65° C. to about 100° C. About 15 grams of the 7% by weight solution of PMMA was added to the UV absorber solution, to obtain a solution containing about 6% by weight PMMA. The loading of UV absorbers are as percentage of total solids, i.e., weight of PMMA plus weight of all UV absorbers. The coatings were applied by flow coating from a dropper onto approximately 2"×4" (5 cm×10 cm) pieces of a polyester film (7 mils (178 microns)) Melinex® 725 PET from DuPont Teijin Films), with adhesion treatment on both sides. The coated films were allowed to dry vertically for about one hour in the ambient laboratory air at a temperature of about 22° C., and a relative humidity of about 20%-24%. Visual assessments were made for UV absorber crystallization and/or separation. Haze measurements were made on a BYK-Gardner haze-gard Plus™ haze meter after drying the coated films in air, and after baking the coated films at a temperature of about 100° C. for a period of 30 minutes in a forced-air oven.

TABLE 1

| Example | DBR# (%) | LA-46* (%) | Tinuvin 1577* (%) | Total UV Absorbers (%) | DBR# (g) | LA-46* (g) | Tinuvin 1577* | Total UV Absorbers (g) | Calculated Absorbance (A/μm) |
|---|---|---|---|---|---|---|---|---|---|
| CEx. 1 | 0 | 0 | 5 | 5 | 0 | 0 | 0.055 | 0.055 | 0.19 |
| CEx. 2 | 0 | 0 | 10 | 10 | 0 | 0 | 0.117 | 0.117 | 0.38 |
| CEx. 3 | 0 | 0 | 15 | 15 | 0 | 0 | 0.185 | 0.185 | 0.56 |
| CEx. 4 | 0 | 0 | 20 | 20 | 0 | 0 | 0.263 | 0.263 | 0.75 |
| CEx. 5 | 0 | 5 | 0 | 5 | 0 | 0.055 | 0 | 0.055 | 0.16 |
| CEx. 6 | 0 | 10 | 0 | 10 | 0 | 0.117 | 0 | 0.117 | 0.31 |
| CEx. 7 | 0 | 15 | 0 | 15 | 0 | 0.185 | 0 | 0.185 | 0.47 |
| CEx. 8 | 0 | 20 | 0 | 20 | 0 | 0.263 | 0 | 0.263 | 0.63 |
| CEx. 9 | 20 | 0 | 0 | 20 | 0.26 | 0 | 0 | 0.263 | 0.56 |
| CEx. 10 | 0 | 10 | 5 | 15 | 0.00 | 0.124 | 0.062 | 0.185 | 0.50 |
| CEx. 11 | 5 | 10 | 5 | 20 | 0.07 | 0.131 | 0.066 | 0.263 | 0.64 |
| Ex. 1 | 10 | 10 | 5 | 25 | 0.14 | 0.140 | 0.070 | 0.350 | 0.78 |
| Ex. 2 | 15 | 10 | 5 | 30 | 0.23 | 0.150 | 0.075 | 0.450 | 0.93 |
| Ex. 3 | 20 | 10 | 5 | 35 | 0.32 | 0.162 | 0.081 | 0.565 | 1.07 |

DBR = 4,6-dibenzoylresorcinol,
*LA46 and Tinuvin ®1577 are triazine compounds from Adeka Corporation and Ciba Specialty Chemicals respectively.

TABLE 2

| Example | DBR# (%) | LA-46* (%) | Tinuvin 1577* (%) | Air-Dry& visual | Air-Dry Haze† (%) | Baked visual | Baked Haze (%) |
|---|---|---|---|---|---|---|---|
| CEx. 1 | 0 | 0 | 5 | X | 16.0 | X | 14.7 |
| CEx. 2 | 0 | 0 | 10 | X | — | — | — |
| CEx. 3 | 0 | 0 | 15 | X | — | — | — |
| CEx. 4 | 0 | 0 | 20 | X | — | — | — |
| CEx. 5 | 0 | 5 | 0 | OK | — | — | — |
| CEx. 6 | 0 | 10 | 0 | OK | 1.03 | OK | 1.05 |
| CEx. 7 | 0 | 15 | 0 | X | — | — | — |
| CEx. 8 | 0 | 20 | 0 | X | — | — | — |
| CEx. 9 | 20 | 0 | 0 | OK | 1.20 | OK | 1.18 |
| CEx. 10 | 0 | 10 | 5 | X | 13.3 | X | 15.1 |
| CEx. 11 | 5 | 10 | 5 | X | 7.50 | X | 8.12 |
| Ex.1 | 10 | 10 | 5 | X | 3.68 | X | 3.47 |
| Ex.2 | 15 | 10 | 5 | OK | 0.80, 1.80 | OK | 1.08, 1.89 |
| Ex.3 | 20 | 10 | 5 | OK | 0.90, 1.01 | OK | 0.74, 0.77 |

DBR = 4,6-dibenzoylresorcinol;
*LA46 and Tinuvin ® 1577 are triazine compounds from Adeka Corporation and Ciba Specialty Chemicals respectively;
&= "X" implies that there is visible crystallization; "OK" means no visible crystallization.

As observed from Table 2, Tinuvin®1577 was found to crystallize (i.e., become incompatible) at even 5% loading (see CEx.1). The addition of 10% LA-46 also did not improve the compatibility, as crystallization was observed. (See CEx. 10). However, the addition of more than about 10% of 4,6-dibenzoylresorcinol to a mixture of Tinuvin 1577 and LA46 gave clear, compatible films (see Ex.1-Ex.3) with high absorbance per micron of thickness (see Table 1).

Solvents

The preparation method described above was employed to synthesize a coated film. The coating composition contained about 20 weight % 4,6-dibenzoylresorcinol, about 10 weight % LA-46, and about 5 weight % Tinuvin®1577 UV absorbers. A number of co-solvents, as shown in Table 3, were employed. It was observed that the samples with the various co-solvents gave clear compatible films. The film with 1-methoxy-2-propanol as the co-solvent required a higher temperature (100° C.) for dissolution.

TABLE 3

| Example** | Solvent | Air dry | % Haze | Baked | % Haze |
|---|---|---|---|---|---|
| Ex. 4 | Toluene | OK | 0.90 | OK | 0.74 |
| Ex. 5 | Xylenes | OK | 0.69 | OK | 0.80 |
| Ex. 6 | diacetone alcohol | OK | 0.64 | OK | 0.55 |
| Ex. 7 | 2-butoxyethanol | OK | 0.75 | OK | 0.88 |
| Ex. 8 | 1-methoxy-2-propanol | OK* | 1.20 | OK* | 0.72 |

*some defects, but no crystals
**All of the examples contained 20 weight % DBR, 10 weight % LA-46, and 5 weight % Tinuvin ® 1577.

From Table 3 it may be seen that a variety of solvents can be used to facilitate dissolution of the UV absorbers and to inhibit haze formation during solvent evaporation.

Preparation of Coated Film on Polycarbonate

Poly(methyl methacrylate (Elvacite® 2041 from Lucite International), was dissolved in 1-methoxy-2-propanol (with heating), to prepare a 7% by weight solution. UV absorbers (about 20 weight % 4,6-dibenzoylresorcinol, about 10 weight % LA-46, and about 5 weight % Tinuvin®1577) were added to the vials and dissolved in 2.65 g of solvent (diacetone alcohol), by heating to a temperature from about 65° C. to about 100° C. About 15 grams of the 7% by weight solution of PMMA was added to the UV absorber solution, to obtain a solution containing about 6% by weight PMMA. The loading of UV absorbers are as a percentage of total solids that is, weight of PMMA plus weight of all UV absorbers.

The coatings were applied by flow coating from a dropper onto approximately. 2"×4"-sized pieces (5 cm×10 cm) of a polycarbonate film (7 mil (178 microns)) unstabilized Lexan® polycarbonate, from SABIC Innovative Polymers). The coated film was allowed to dry vertically for about one hour in the ambient laboratory air at a temperature of about 22° C. and a relative humidity of about 20%-24%. Visual assessments were made for UV absorber crystallization or separation. Haze measurements were made on a BYK-Gardner haze-gard Plus™ haze meter, after drying the coated films in air, and after baking the coated films at a temperature of about 100° C. for a period of 30 minutes in a forced-air oven.

It was observed that after air-drying, the coating showed a few defects, but no crystallization of the triazines. The film had a haze of 0.85% (blank film: 0.63%). The film was oven baked at 100° C. for a duration of about 30 minutes. It was seen that on baking, the defects had disappeared and the haze was 0.72%. This indicates that the coated film is free from crystallization, irrespective of the substrate employed.

Preparation of Coated Films Using di(4'-tert-butylbenzoyl) resorcinol

Poly(methyl methacrylate (Elvacite® 2041 from Lucite International), was dissolved in 1-methoxy-2-propanol (with heating), to prepare a 7% by weight solution. UV absorbers (about 20 weight % 4,6-di(4'-tert-butylbenzoyl)resorcinol, about 10 weight % LA-46, and about 5 weight % Tinuvin 1577) were added to the vials and dissolved in 2.65 g of solvent (diacetone alcohol), by heating to a temperature from about 65° C. to about 100° C. About 15 grams of the 7% by weight solution of PMMA was added to the UV absorber solution, to obtain a solution containing about 6% by weight PMMA. The loading of UV absorbers are as percentage of total solids that is, weight of PMMA plus weight of all UV absorbers. The coatings were applied by flow coating from a dropper onto approx. 2"×4" (5 cm×10 cm) pieces of a polyester film (7 mils (178 microns)) Melinex® 725 PET from DuPont Teijin Films), treated on both sides to improve adhesion. The coated film was allowed to dry vertically for about one hour in the ambient laboratory air at a temperature of about 22° C. and a relative humidity of about 20%-24%. Visual assessments were made for UV absorber crystallization or separation. Haze measurements were made on a BYK-Gardner haze-gard Plus™ haze meter. The measurements were made after drying the coated films in air and baking the films at a temperature of about 100° C., for a period of 30 minutes in a forced-air oven.

It was observed that after air drying, the coating was clear, indicating that no crystallization had occurred. The coating after air drying had a haze of 0.68%. The baked coating were found to be clear, with no defects and crystallization. The baked coatings had a haze of 0.57%.

Photostability of UV Absorbers

Solutions of UV absorber (2.0 g of Elvacite 2041 PMMA, and 8 mL of chloroform) were cast on a glass plate using a 6 mil doctor blade to make films of about 20 microns thick. The films were dried in an air oven at 65° C. overnight, floated off with water, and mounted in plastic slide holders. The films were exposed in an Atlas Ci5000 xenon arc Weather-ometer® equipped with RightLight/CIRA quartz filters and operating at $0.80\,\mathrm{Wm^{-2}nm^{-1}}$ at 340 nm. The loss rate was determined as the negative slope of $\log(10^{-4}-1)$ vs. exposure as described in J. Test. Eval, 32(3), 240-245 (2004). The results are shown in Table 4.

TABLE 4

| Example | UV Absorber | Class | Loss Rate $(A/MJm^{-2}nm^{-1})$ |
|---|---|---|---|
| CEx. 12 | Cyasorb 1164** | dimethylphenyl triazine | 0.085* |
| CEx 13 | Tinuvin 479*** | biphenyl triazine | 0.046 |
| CEx. 14. | CGL 006*** | biphenyl triazine | 0.054 |
| Ex. 9 | LA-46 | phenyl triazine | 0.015 |
| Ex. 10 | Tinuvin 1577 | phenyl triazine | <0.02 |
| Ex. 11 | 4,6-dibenzoylresorcinol | dibenzoylresorcinol | 0.016 |

*value from J. E. Pickett, "Permanence of UV Absorbers in Plastics and Coatings", in Handbook of Polymer Degradation, 2nd Edition, S. H. Hamid, Ed., Marcel Dekker, (2000) p. 180.
**Product of Cytec Industries.
***Product of Ciba Specialty Chemicals.

From Table 4 it may be observed that the UV absorbers (Ex.9-Ex.11) have loss rates less than 0.02 A/MJ in comparison with the dimethylphenyl triazine and biphenyl triazine UV absorbers, which have loss rates equal to or greater than about 0.05 A/MJ (CEx.12-CEx.14) under identical conditions. Therefore, excellent permanence in addition to high absorbtivity and low haze may be attained by the mixture of phenyl triazines and a dibenzoylresorcinol.

While the invention has been described with reference to exemplary embodiments, it will be understood by those skilled in the art that various changes may be made, and equivalents may be substituted for elements thereof, without departing from the scope of the invention. In addition, many modifications may be made to adapt a particular situation or material to the teachings of the invention, without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An optoelectronic device, comprising:
   a substrate;
   a UV-protective coating composition, disposed on at least one electromagnetic radiation-receiving or radiation-emitting surface of the device, wherein the coating composition comprises:
   an acrylate polymer; and
   a non-crystallizing UV-absorber composition comprising a dibenzoylresorcinol and a triazine, wherein the dibenzoylresorcinol is present at a level sufficient to prevent the substantial crystallization of the triazine compound, under temperature and humidity conditions of evaporation for solvents or solvent mixtures in the coating composition, after deposition of the coating on a selected substrate.

2. The optoelectronic device of claim 1, in the form of a photodiode, a light emitting diode, a photovoltaic device, a camera, a photo detector, or a semiconductor laser.

3. The optoelectronic device of claim 1, in the form of a photovoltaic cell or a photovoltaic module.

4. The optoelectronic device of claim 3, wherein the photovoltaic cell or a photovoltaic module comprises an amorphous silicon cell, a crystalline silicon cell, a hybrid/heterojunction amorphous and crystalline silicon cell, a CdTe thin film cell, a micromorph tandem silicon thin film cell, a Cu(In, Ga)Se$_2$ (CIGS) thin film cell, a GaAs cell, a multiple junction III-V-based solar cell, a dye-sensitized solar cell, or a solid-state organic/polymer solar cell.

5. The optoelectronic device of claim 1, wherein the dibenzoylresorcinol is present at a level in the range of about 10 weight percent to about 30 weight percent, based on the weight of the total solids in the coating composition.

* * * * *